US006757279B1

(12) United States Patent (10) Patent No.: US 6,757,279 B1
Furlong et al. (45) Date of Patent: Jun. 29, 2004

(54) METHOD FOR SYNCHRONIZING DATABASES IN STACKED NETWORK UNITS

(75) Inventors: Peter Furlong, Dublin (IE); Daniel M O'Keeffe, Ballyhooly (IE); Eoghan Stack, Dublin (IE); Neil J Clifford, Dublin (IE); Eoin O'Brien, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 764 days.

(21) Appl. No.: 09/662,159

(22) Filed: Sep. 14, 2000

(30) Foreign Application Priority Data

May 20, 2000 (GB) ............................................... 0012120

(51) Int. Cl.[7] .............................................. H04L 12/50
(52) U.S. Cl. ........................ 370/387; 370/396; 370/400
(58) Field of Search ................................ 370/351, 357, 370/360, 362, 373, 380, 386, 387, 389, 392, 396, 395.3, 395.31, 400, 422, 423, 424, 426

(56) References Cited

U.S. PATENT DOCUMENTS

| 5,938,736 | A | * | 8/1999 | Muller et al. ................ 709/243 |
| 5,949,788 | A | * | 9/1999 | Friedman et al. ............ 370/431 |
| 6,128,296 | A | * | 10/2000 | Daruwalla et al. ........... 370/389 |
| 6,266,335 | B1 | * | 7/2001 | Bhaskaran .................... 370/399 |
| 6,490,276 | B1 | * | 12/2002 | Salett et al. .................. 370/360 |
| 6,496,502 | B1 | * | 12/2002 | Fite et al. ..................... 370/389 |
| 6,636,499 | B1 | * | 10/2003 | Dowling ...................... 370/338 |
| 6,654,796 | B1 | * | 11/2003 | Slater et al. ................. 709/220 |

FOREIGN PATENT DOCUMENTS

| GB | 2333429 A | 7/1999 |
| GB | 2337674 A | 11/1999 |

* cited by examiner

*Primary Examiner*—Hassan Kizou
*Assistant Examiner*—Dmitry Levitan
(74) *Attorney, Agent, or Firm*—Nixon & Vanderhye P.C.

(57) ABSTRACT

In a stack of multi-port network communication units each unit has a forwarding database, the units are connected by way of a cascade, and at least some of the units are connected to links constituting a trunk. When a unicast data packet is received at a first of said units and the unicast data packet has a destination address which is not the subject of an entry in the forwarding database of the first unit, the unicast data packet is sent by way of the cascade to the other units in the stack, accompanied by a flag. When a second unit has in its forwarding database an entry, associating the destination address with forwarding data, it sends a management packet indicating said destination address and the identity of said second unit, so that the database of the first unit can be immediately updated.

5 Claims, 7 Drawing Sheets

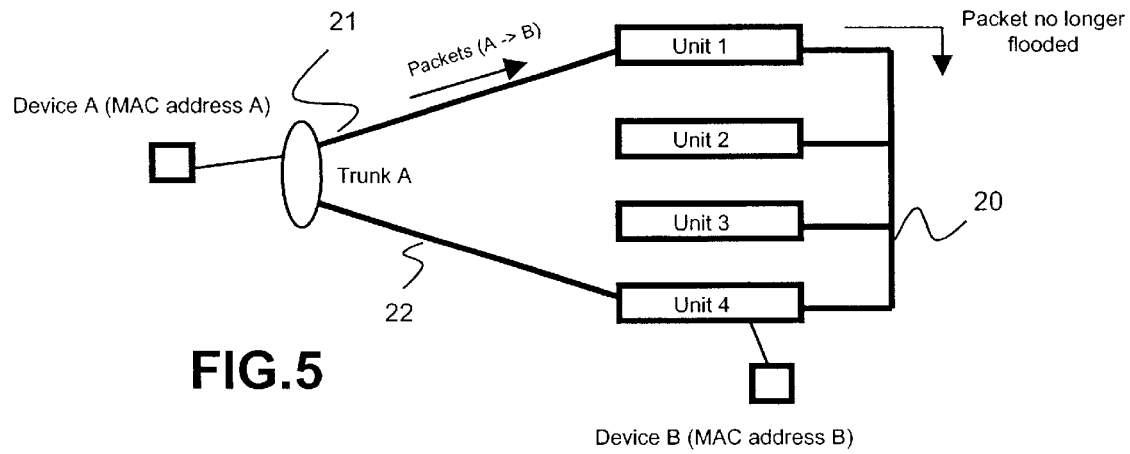
FIG.5
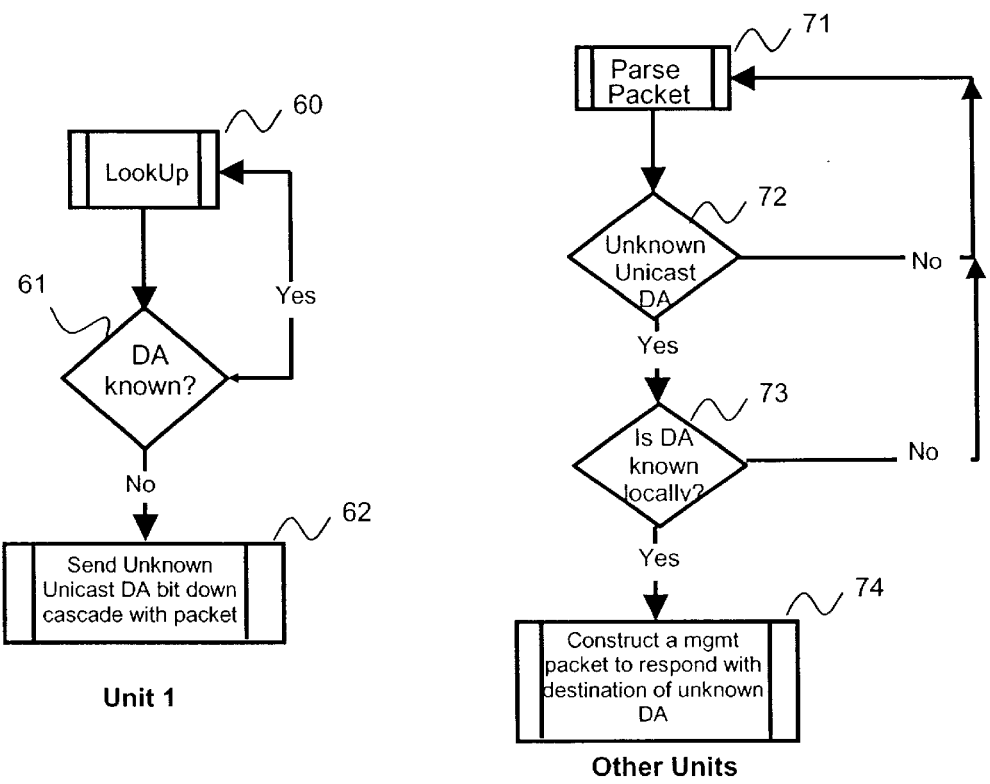
FIG.6  FIG.7

METHOD FOR SYNCHRONIZING DATABASES IN STACKED NETWORK UNITS

FIELD OF THE INVENTION

This invention relates to the management of forwarding databases in a cascaded stack of network units, particularly multi-port switches, in a packet-based data communication system which employs addressed data packets. The invention particularly relates to the reduction of unnecessary traffic flow constituted by the broadcast or 'flooding' of packets having unknown destination MAC (media access control) addresses.

BACKGROUND TO THE INVENTION

Packet-based data communication systems, such as Ethernet systems, commonly employ address data packets (otherwise called frames) which include source and destination media access control addresses as well as, usually, other type, control and address data, such as network address or IP address data. Data of this character normally precedes the payload or message data of a packet. The MAC address data in such a packet defines, in media access control or "layer 2" terms, the device from which a packet has come and to which a packet should be sent. There are various forms of packet including "multicast" packets, which have an address specifying a group of destination devices, and "broadcast" packets, which should be sent to all possible destinations. Excessive broadcasting of packets is limited by the segmentation of a network into, for example, virtual local area networks, and it is common for packets to contain an identification of the virtual local area network (VLAN) on which they originate.

Notwithstanding the variety of packets, the present invention will be particularly concerned with 'unicast' packets. If such a packet is received by a network unit, it is usually subject to a look-up in a database. Such a database, normally called 'forwarding database', contains destination addresses with forwarding data, such as port numbers, and other data. Different forms of forwarding databases, including those which can be looked up by means of media access control addresses and network (IP) addresses are known. Various methods of look-up are also known in the literature.

Broadly, a forwarding database may be compiled by reading the source MAC addresses of incoming data packets and, if such source address is not in the database the entry of that source address can be made together with irrelevant forwarding data, for example the port on which that packet was received Then, when a packet is received having a destination address which matches an entry in the table, the packet can be sent to that destination address defined by the forwarding data in the data entry. It is also known to add entries in such a database by means of 'management' frames, particularly when a network is initially set up.

If a unit receives a packet which has an 'unknown' destination address, that is to say an address which is not the subject of an entry in the table, it is usual to 'flood' the packet, that is to say to send it to all the possible ports of the unit. This is a preliminary to an 'address resolution protocol' wherein when such a flooded packet is received by a device which has a network address corresponding to the address in the packet it will reply and the relevant destination address can be entered into the database for subsequent use in relation to packets intended for the destination.

Stacked Units

A feature of modern network practice is 'stacking' of units such as switches so as to form in effect a single entity. Switches which are similar or at least compatible may be connected together, as explained later, so that for example four switches having, for example, 24 ports each may behave as a single 96-port switch. The term 'stackable' is a conventional term in these circumstances. It is customary to stack the units physically one on top of the other but the term is intended to relate to the functional relationship between them.

Cascades

A group of stacked units requires a means of communication which is generally termed a 'cascade'. A cascade is connected to at least one port on each unit and provides in effect a communication ring by means of which a packet which leaves a unit by way of a port (termed a cascade port) connected to the ring can reach all the other units by way of the ring. Cascades normally include a variety of control mechanisms which enable a given unit to determine the unit by which a packet was placed on the cascade, mechanisms to prevent circulation of its packets continuously on the ring and so on. Cascades are known in a variety of forms. Examples are:

Trunking

A further known feature in network practice relevant to the invention is 'trunking', which is described in for example WO99/29072 and GB-2333429. The tern is used to describe a communication link which essentially comprises a multiplicity of links from a device or group of devices to another device or group. In its simplest form it is constituted by a multiplicity of links each to a respective port on a single unit from a single source entity, a typical feature is that traffic intended for a particular destination may arrive at any of the links constituting the trunk. Trunking is known to be useful in order to increase the bandwidth available for traffic from a particular source or going to a particular destination.

It is generally desirable in order to provide appropriate versatility in network connections, to allow the connection of the links constituting the trunk to different ports not only on the same network unit such as a switch but also to ports on different units of a stack. Such a trunk may be termed a 'stack-wide trunk'. It is not necessary for all the units in a stack to have a port which is a 'member' of the trunk. Copending patent application of O'Keeffe et al., Ser. No. 09/562,131 filed May 1, 2000, and assigned to the same assignee as the present application describes such a stack-wide trunk and is incorporated by reference herein.

SUMMARY OF THE INVENTION

The present invention relates specifically to a problem arising from excessive flooding of packets containing 'unknown' unicast destination MAC addresses. When network switches are stacked together, it is normal practice to flood such addresses out on all ports of the stack. Thus if a liven unit in the stack receives on one of its ports a packet of which the destination MAC address is not the subject of an entry in its forwarding database, the unit will not only flood that packet out on all the ports (or at least all those ports for which such flooding is possible or enabled) but will also place the packet on the cascade so that the packet reaches all the other units in the stack so as to be flooded from all the relevant ports. Although this flooding causes a temporary and inevitable degradation in bandwidth and performance of the network, eventually a response from the destination MAC address in question will cause that address to be 'learned', that is to say made the subject of an entry in the forwarding database of all the units in the stack. Then whether a unit receives a packet containing that specific destination MAC address by way of one of its ports directly or by way of the cascade, no flooding will occur subsequently while the destination MAC address remains in the database. However, in a network system where there is a stack-wide trunk, a response from a remote device which would resolve that unknown destination address will be sent to one of the units in the stack but need not necessarily reach all the other units of the stack. More particularly, the response which would enable resolution of the unknown destination MAC address may be sent by the receiving unit back along the trunk by way of a different link to that on which the packet was originally received.

This problem can be alleviated at present by means of separate flagged storage of unknown unicast destination MAC addresses. More particularly, if a unit receives an unknown unicast destination MAC address, it will save the destination MAC address in a distinctive manner, for example in a separate area in memory or with a special flag. The stack of units may be controlled by stack-wide software, which polls each unit to determine whether any of the units have received any unknown unicast MAC addresses and has recourse to the forwarding, databases of all the units to resolve the unknown unicast destination MAC addresses for all the units. However, such a solution is generally slow and is limited by the size of the storage available and the speed at which the software can be permitted to poll all units on the stack. More particularly polling of units will require bandwidth on the cascade which is then not available for ordinary traffic flow.

The present invention is based on the transmission of a packet which has an unknown unicast MAC destination address on the cascade with a flag, which may be constituted by a single bit, to indicate that the destination address is unknown. Such a flag may be constituted by otherwise redundant field space in the header of tile packet, for example a VLAN tag header as described later. All the units on the cascade will receive the flagged packet and if any unit already has that MAC address in its database, it will produce a management frame which is sent on the cascade indicating, to the other units of the stack the location of the unknown MAC address. This allows all units on the stack to 'learn' that destination MAC address, i.e. make it the subject of an entry in its forwarding database, the entry including appropriate forwarding data for that destination address.

Further features of the invention will be apparent from the following description with respect to the accompanying drawings.

BRIEF DESCRIPTION OF THE DRAWINGS

FIG. 5 is a further phase of operation of the stack.

FIG. 6 is a flow diagram illustrating the production of a flag for an unknown unicast packet.

FIG. 7 is a flow diagram illustrating the operation of units which receive a flagged packet.

DETAILED DESCRIPTION

Figure 1:
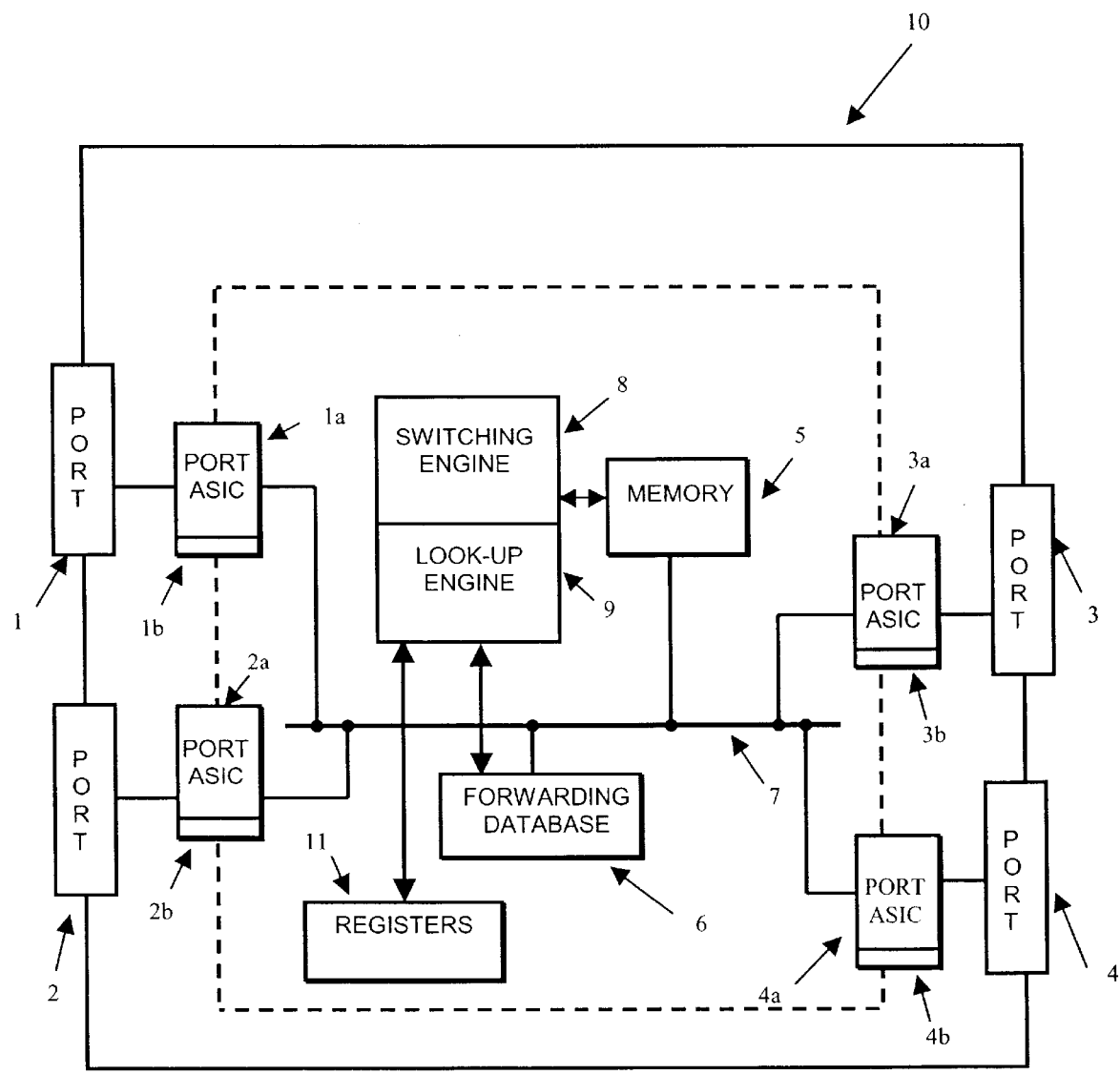
FIG. 1 illustrates a switch having a multiplicity of ports for receiving and forwarding data packets and other generally conventional features.

FIG. 1 illustrates in a deliberately simplified way a multi-port switch for a packet-based data communication system. The switch 10 may in general have a substantial number of ports, such as twenty-four or even many more, but in the present example is shown as having four ports 1, 2, 3 and 4. Each of these ports is associated with a 'Port ASIC' 1a–4a respectively. These port ASICs provide the customary processing of packets after they have received and before they are subject to the look-up and forwarding process. Very typically, the port ASICs may be constituted on a single integrated circuit along with most of the other components of the switch, with the possible exception of some of the memory 5, but it is not intended to limit the present invention to any particular hardware implementation or configuration. Generally, packets received by any of the ports may, after temporary storage in FIFOs schematically represented as 1b to 4b for each of the ports, will be stored in memory 5 while address data in the packets is examined to find matches of destination addresses in a forwarding database 6. As previously mentioned, this type of forwarding database may be compiled by an examination of source MAC addresses in incoming packets in a manner which is well known in the art. The switch has a bus system 7, shown as a single bus line merely for convenience, and a switching engine 8 associated with a look-up engine 9. These may be constituted by a single software or hardware controlled entity which has recourse to the forwarding database 6 as well as providing control of the memory 5. Again, as is well known in the art, the look-up engine 9 (called herein 'forwarding engine') will perform look-ups in the forwarding database 6 and the combined entity of switching engine 8 and look-up engine 9 will cause entries in the database as well as retrieval of packets from memory 5 so that packets can be forwarded to the port or ports indicated by the nature of the address data. For the sake of completeness the switch 10 is shown as including registers 11 which store configuration data for the switching and look-up engines.

It is known to insert entries in a forwarding database such as database 6 by means of external control exerted by management packets This may be necessary when initially configuring the switch or for other purposes.

Figure 2:
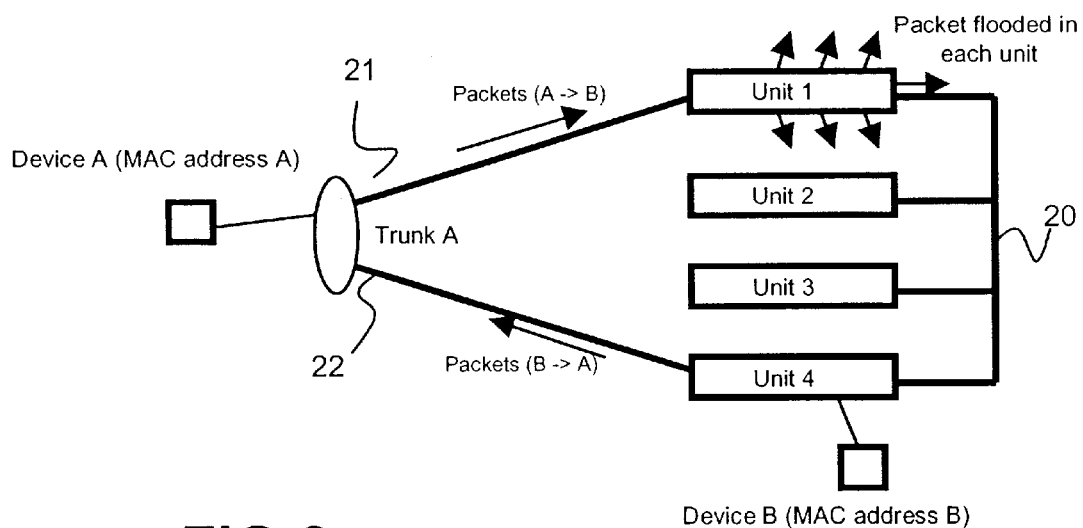
FIG. 2 illustrates a stack of units connected by a cascade and having a trunk connection to some of the units in the stack.

FIG. 2 illustrates one form of stack-wide trunk to which the invention particularly relates. In this example there are four switch units, denoted Unit 1 to Unit 4, which are connected by way of a cascade 20 which may be in any of the forms previously described. There is a remote device A, which is connected to the stack by means of two communication links 21 and 22 constituting a trunk By this is meant that the device 20 may provide traffic to the stack on either of the links constituting the trunk and may receive traffic on either of the two members of the trunk.

FIG. 2 illustrates a specific circumstance wherein device A, having a MAC address A, is connected to switch 20 and is intending to communicate with device B having MAC address B. It is supposed for the sake of example that packets sent from device A to device B proceed on member 21 of the trunk whereas packets from device B to device A proceed from Unit 4 towards device B on link 22.

When packets for device B are first received on Unit 1, that unit does not have the MAC address of device B in its forwarding database. Accordingly, the packet is 'flooded' to all ports on the stack. That is to say the packet is sent out by way of all appropriate or enabled ports on Unit 1 as well as on the cascade port connected to cascade 20 so that the packet reaches all the other units in the stack.

When device B eventually responds to device A, the response is sent back on a different link on the trunk. This may happen fortuitously, though it is known to have a forwarding rule known as a 'local forwarding rule' wherein a given unit on a stack on receiving a packet intended for the trunk will forward such a packet directly to the trunk.

If this occurs, the traffic pattern will prevent the receiving Unit 1 from ever learning the destination of the original unknown MAC address via the ARP (Address Resolution Protocol) response. The unknown MAC address may be learned by a polling routine as described previously, but the present invention is intended to provide a technique which improves on that polling process.

Figure 3:
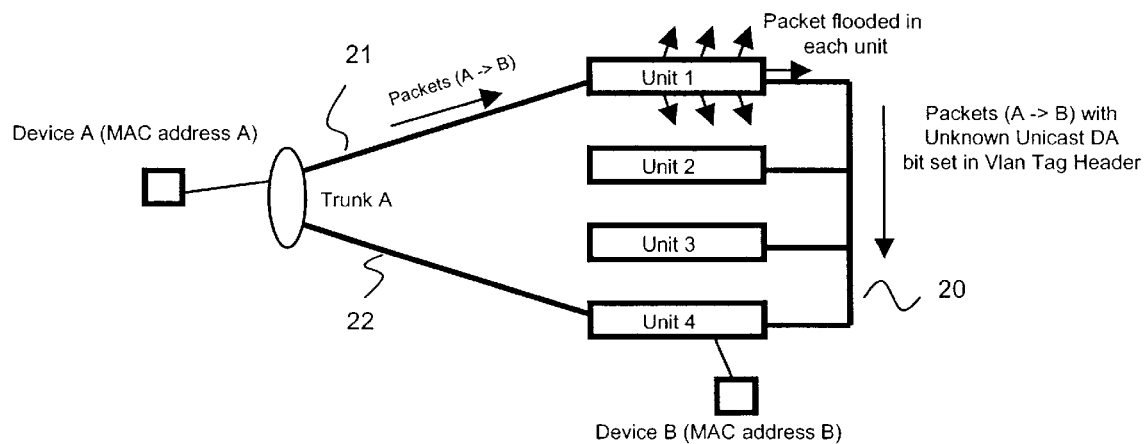
FIG. 3 illustrates an operational phase of the stack shown in FIG. 2.

FIG. 3 illustrates the first phase in the present solution to the problem. When packets arrive at Unit 1 from device A, destined for device B, and if Unit 1 does not yet have that destination MAC address B in its forwarding database, then, as before, the packet will be flooded to all relevant ports in the stack However, when sending the packet down the cascade it also sends a flag, herein called 'unknown unicast DA flag' with the packet indicating that the destination MAC address of the packet was unknown when it was received by unit 1. A possible way of inserting this flag is described later. All units on the cascade receive the packet and check the status of the flag. If any unit already has in its database the MAC destination address of B and the unknown unicast DA flag is set then it must take action.

Figure 4:
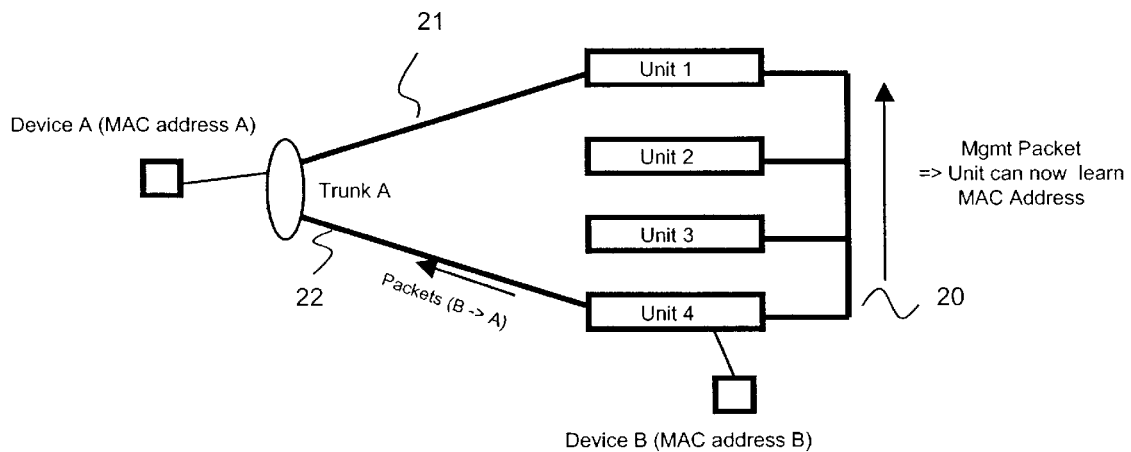
FIG. 4 illustrates another phase of operation of the stack.

FIG. 3 indicates that Unit 4 is the unit which will take action because it has device B connected to one of its local ports. In accordance with the invention and as shown in FIG. 4, Unit 4 will send a special management packet back up the cascade indicating (in a manner described later) to the other units in the stack that it has the relevant forwarding data for that unknown MAC address. This allows all units on the stack to learn the location of that MAC address. Thus there is no longer a need to flood packets to all units on the stack.

FIG. 5 illustrates the subsequent phase wherein packets received by Unit 1 by way of the trunk from device A and intended for device B will be sent only by way of the cascade to device B.

FIG. 6 is a flow diagram showing the initial phase. Unit 1 will perform a look-up stage 60, in its forwarding database to determine (stage 61 ) whether the destination address of a packet is known. If the destination address is not known then the unknown unicast DA bit will be sent down the cascade with the packet (stage 62).

FIG. 7 illustrates the operation of the receiving units (i.e. Units 2 to 4 in this example). They parse a received packet (stage 71). If there is detection of an unknown unicast destination address (stage 72) the relevant forwarding engine will determine (stage 73) whether the destination address is known locally (i.e. whether it is in the database of the receiving unit). If it is known, then this unit will construct (stage 74) a management packet to respond with destination of unknown destination address.

Figure 8:
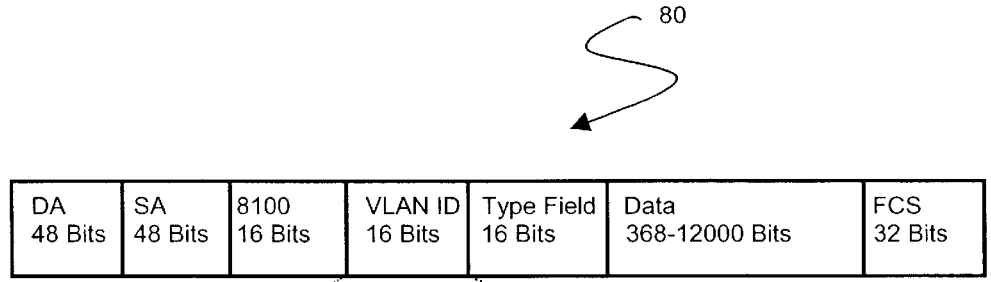
FIG. 8 illustrates an Ethernet packet in a typical form.

FIG. 8 is a diagram of an Ethernet data packet 80. The header includes a 48-bit destination address (DA) and a 48-bit source address (SA). The packet may include network (layer 3) address data but for simplicity this address data is not shown and may be regarded as included within the "data". It is customary for packets of this nature to contain a 16-bit VLAN identification field included in the packet header and normally containing a priority field, a CFI (Canonical Format Indicator) bit and a "VLAN ID". It is also customary for such a VLAN identification field to be preceded by a VLAN tag header, known as the 8100 Field.

Figure 9:
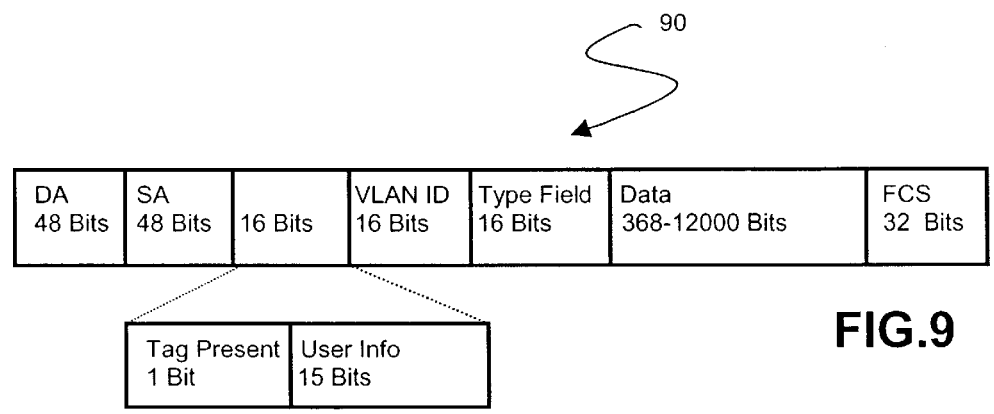
FIG. 9 illustrates a method of flagging such a packet.

It is possible to utilise the tag header field to convey information within a system such as a stack of units because the tag header field is redundant while the packet remains within the system. The 16-bit tag header field may be modified so that, for example, as shown by the packet 90 in FIG. 9, the field contains a first bit, a 'tag present' bit indicating that the original packet had a VLAN identification field and 15 bits which may be used for selected information, such as the 'unknown destination address flag' previously mentioned.

Figure 10:
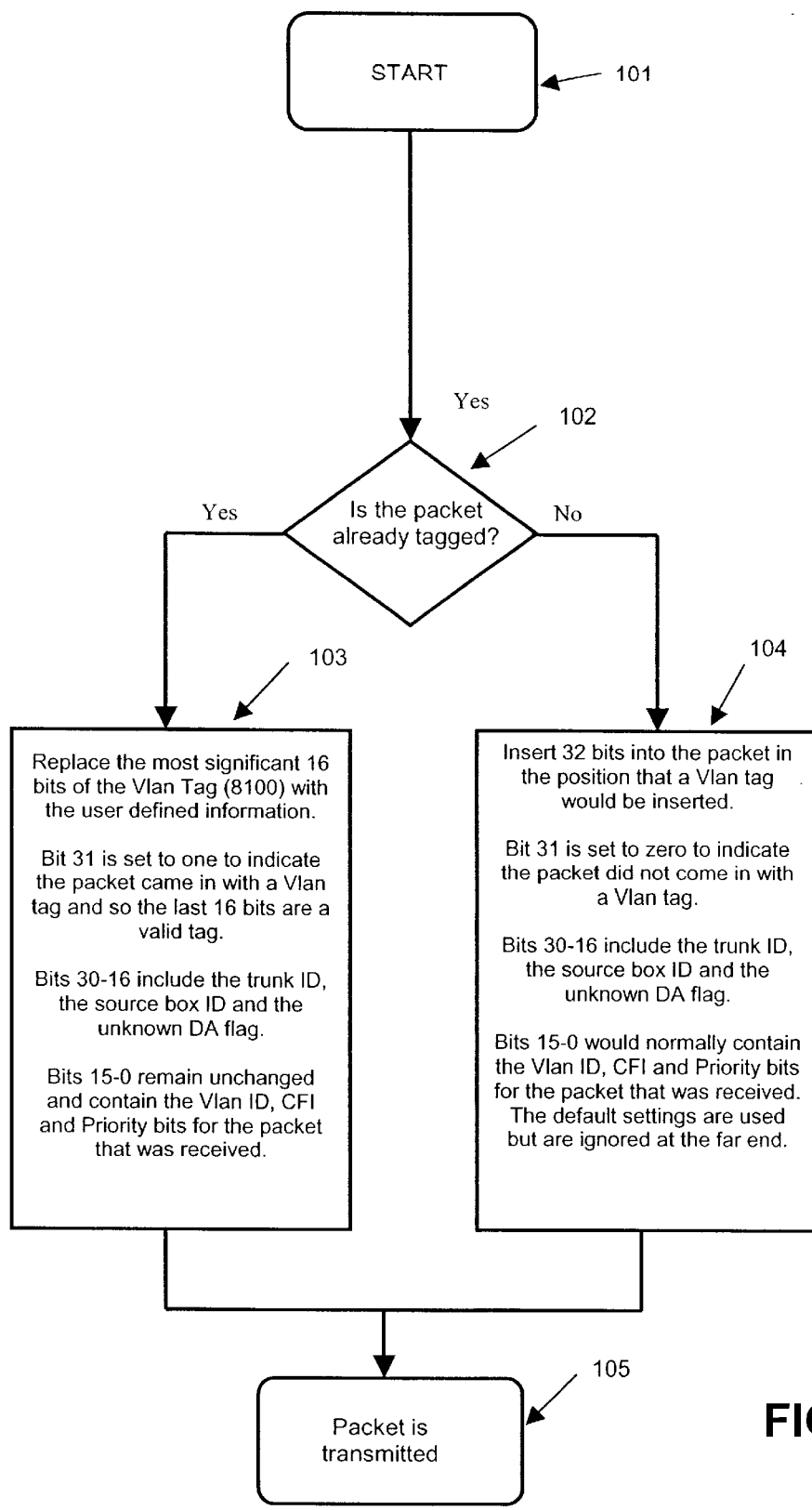
FIG. 10 illustrates a specific routine for placing a flag on a packet.

FIG. 10 illustrates a process by which the VLAN tag header is substituted. The process has two branches, depending on whether the packet entering the stack contained a VLAN identification field or not. From a start stage (101) which depends on stage 62 of FIG. 6, there is a determination (stage 102) whether the packet is already tagged, that is to say has a VLAN identification field. If the packet is already tagged, then stage 103 is performed, this stage consisting of replacing the most significant 16 bits of the VLAN tag with the user defined information. The most significant bit (bit 31) is set to "1" to indicate that the packet came with the VLAN tag and so the last 16 bits constitute a valid tag. Bits 30–16 may include (for the sake of an example) an identification number for the trunk, an identification number for the originating unit, such as Unit 1, and the "unknown destination address flag". The remaining bits, bits 15–0, are unchanged.

If the packet were not already tagged, then stage 104 is performed. This requires the insertion of 32 bits into the packet in the position that would normally be occupied by a VLAN tag.

The most significant bit, bit 31, would be set to zero to indicate that the packet did not come in with the VLAN tag. Bits 30–16 are determined in the same way as bits 30–16 in stage 103. The remaining bits, bits 15–0, which would normally contain the VLAN ID, CFI and priority bits for the packet may be set to some default values.

Whichever of the stages 103 or 104 is performed, the packet is transmitted down the cascade. When the packet ultimately leaves the stack of units, the most significant bit of the substituted VLAN header tag will determine whether the ordinary tag field (as shown in FIG. 8) is to be re-inserted or the whole 32 bits of the VLAN tag are to be removed from the packet before it finally leaves the system constituted by the stack of units.

Figure 11:
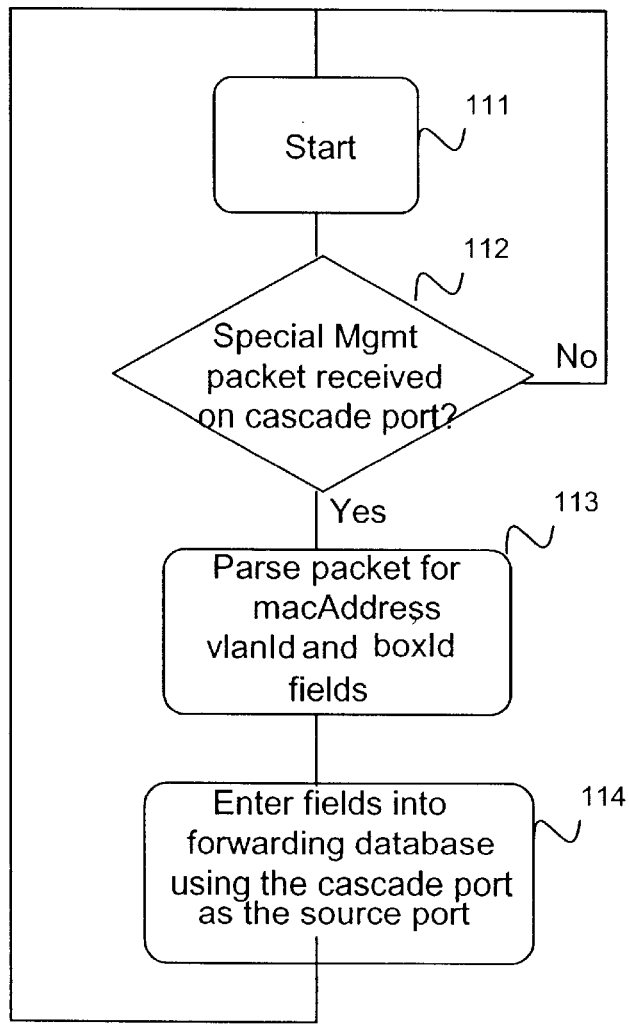
FIG. 11 illustrates the response of a unit to a special management packet.

FIG. 11 illustrates the process performed in a unit in response to a special management packet received on its cascade port (or one of its cascade ports if more than one is connected to the cascade).

From a start stage 111, there is a determination whether a special management packet has been received on the cascade port. This stage (stage 112) and the next stage may be performed by a MAC device within the relevant port ASIC (see FIG. 1). Stage 113 indicates that if tile special management packet is detected, it is parsed for the MAC address defined within it, as well as (preferably) a VLAN identification as well as a 'box ID' field. The latter is an identification of the unit which has originated the special management packet.

The parsing of the packet provides commands for (as shown by stage 114) the relevant fields can be entered into the forwarding database The forwarding data for that destination address is preferably the cascade port on which the management packet was received. In this way when, for example, Unit 1 is shown in FIG. 5 receives a subsequent packet having the previously unknown destination MAC address, it will have sufficient forwarding data associated with the entry in the forwarding database to be able to forward such a packet only to the cascade, as shown in FIG. 5.

Figure 12:
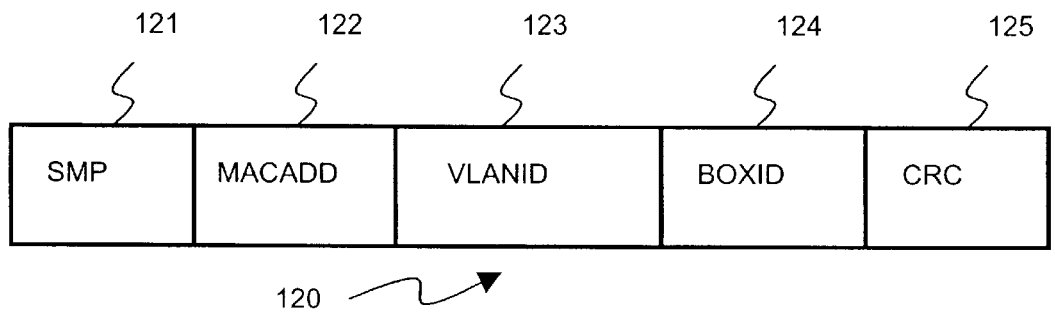
FIG. 12 schematically illustrates a special management packet.

FIG. 12 illustrates for the sake of completeness a typical management packet of the kind which can be employed in the present invention. The packet 120 (ignoring such conventional features as a preamble or start of frame, includes an SNIP field denoting that the packet is a special management packet which should be parsed according to stage 113 to develop the commands relative to stage 114, the relevant MAC address 112, the VLAN ID 123, the 'box ID' 124 and a cyclic redundancy code 125.

The MAC address will be entered in the unit's database along with the forwarding data, which may be the cascade port or the 'box ID' or both depending on the organisation of the unit's forwarding engine. Provided that the forwarding data ensures that (for example) a unicast packet for device B received by Unit 1 is now directed only to Unit 4 by way of the cascade the particular mechanism is not important.

What is claimed is:

1. A method of operating a stack of multi-port network communication units each of which has a forwarding database, the units being connected by way of a cascade, and at least some of the units being connected to links constituting a trunk, the method comprising:

receiving by way of the trunk a unicast data packet at a first of said units;

sending, when said unicast data packet has a destination address which is not the subject of an entry in the forwarding database of the first unit, said unicast data packet by way of the cascade to the other units in the stack, accompanied by a flag denoting the absence of said entry;

sending, for a second unit in the stack, when said second unit has an entry in its forwarding database, associating said destination address with forwarding data, a management packet indicating said destination address and the identity of said second unit; and in response to said managment packet, making in the forwarding database of said first unit an entry relating the said destination address and said identity of said second unit.

2. A method according to claim 1 wherein the flag comprises a field in a header of the unicast packet as it is sent on the cascade.

3. A method according to claim 1 wherein said address is a media access control (MAC) address.

4. A multiport network switch for data packets which include media access control addresses, the switch including a forwarding database for relating destination MAC addresses to respective forwarding data, the switch being operable in a stack of units connected by a cascade, said switch having a forwarding engine, said forwarding engine being operative:

(i) on reception of a unicast data packet having a destination address which is not the subject of an entry in said database to forward said unicast packet to the cascade with a header field denoting the absence of said entry;

(ii) on reception of a unicast data packet which has a header field denoting the absence of the destination address of the unicast packet in the database of another unit to determine whether the destination address is in the switch's database, and to provide a management packet containing the destination address and an identification of the respective unit; and (iii) in response to receipt of such a management packet from another unit, to make in the forwarding database an entry relating the destination address and the respective identification.

5. A stack comprising:

a plurality of multiport network units each of which includes a multiplicity of ports for the reception and forwarding of addressed data packets, a respective database for relating destination MAC addresses to forwarding data and a forwarding engine for controlling the forwarding of packets in accordance with the forwarding data;

a cascade connection to a least one port of each unit, said cascade connection conveying packets between units in the stack; and a trunk connection to ports on different units of the stack;

wherein each forwarding engine is operative:

(i) on reception of a unicast data packet having, a destination address which is not the subject of an entry in the respective database to forward said packet to the cascade connection with a flag denoting the absence of said entry;

(ii) on reception of a unicast data packet which is flagged to denote the absence of such an entry in the database of another unit to send, if such an entry is in the respective database, a management packet containing the destination address and an identification of the unit; and (iii) in response to receipt of such a management packet from another unit, to make in the respective forwarding database an entry relating the destination address and the identification.

* * * * *